US012658976B2

(12) United States Patent
Neighbour et al.

(10) Patent No.: US 12,658,976 B2
(45) Date of Patent: Jun. 16, 2026

(54) SYSTEMS AND METHODS FOR OPTIMIZING SHORT-RANGE WIRELESS READ OF CONTACTLESS CARDS USING VIDEO SIGNAL

(71) Applicant: Capital One Services, LLC, McLean, VA (US)

(72) Inventors: Erik Neighbour, McLean, VA (US); Anatoly Ivasyuk, Falls Church, VA (US); Christopher Matthews, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/388,945

(22) Filed: Nov. 13, 2023

(65) Prior Publication Data

US 2025/0158658 A1     May 15, 2025

(51) Int. Cl.
*H04B 5/77* (2024.01)
*G01J 1/42* (2006.01)
(Continued)

(52) U.S. Cl.
CPC .............. *H04B 5/77* (2024.01); *G01J 1/4204* (2013.01); *G01J 5/0859* (2013.01); *G06T 7/20* (2013.01);
(Continued)

(58) Field of Classification Search
None
See application file for complete search history.

(56) References Cited

U.S. PATENT DOCUMENTS

| | | | |
|---|---|---|---|
| 4,683,553 A | 7/1987 | Mollier | |
| 4,827,113 A | 5/1989 | Rikuna | |
| | (Continued) | | |

FOREIGN PATENT DOCUMENTS

| | | |
|---|---|---|
| CA | 3010336 | 7/2017 |
| CN | 101192295 | 6/2008 |
| | (Continued) | |

OTHER PUBLICATIONS

Batina, Lejla and Poll, Erik, "SmartCards and RFID," PowerPoint Presentation for IPA Security Course, Digital Security at University of Nijmegen, Netherlands (date unknown), 75 pages.
(Continued)

*Primary Examiner* — John F Mortell
(74) *Attorney, Agent, or Firm* — KDW Firm PLLC; Andrew D. Kasnevich

(57)     ABSTRACT

The disclosed systems and methods are directed to optimizing short-range wireless read operation for performing a proximity-based reading of a contactless card by an NFC reading unit of a user device. An exemplary implementation utilizes a video signal from a camera unit of the user device which is automatically activated upon detection of an NFC tag within a communication field of the reading unit. Various aspects of the video signal may be analyzed and processed for determination of the final position of the card on the user device, prior to performing an NFC read, following a card tap action by the user. The exemplary implementation uses variations in signal attributes of the video feed to determine a trajectory of the card within the optical view field until the video signal goes dark or drops below a threshold.

20 Claims, 5 Drawing Sheets

200

Field Of View (A) (104)     (B) (104)     (208)     (C) (104)     (205) (204) (208) Light Sensor     (136)     (110)

Proc&Mem (212)

(204A)     (204B)     (204C)     (104)

(51) Int. Cl.

| | |
|---|---|
| *G01J 5/08* | (2022.01) |
| *G06T 7/20* | (2017.01) |
| *G06T 7/70* | (2017.01) |
| *G06V 20/40* | (2022.01) |
| *G01J 5/00* | (2022.01) |

(52) U.S. Cl.

CPC ............... *G06T 7/70* (2017.01); *G06V 20/40* (2022.01); *G01J 2005/0077* (2013.01); *G06T 2207/10016* (2013.01); *G06T 2207/10048* (2013.01); *G06T 2207/30241* (2013.01)

(56) References Cited

U.S. PATENT DOCUMENTS

| | | | |
|---|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,590,038 A | 12/1996 | Pitroda |
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,572,015 B1 | 6/2003 | Norton |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,252,242 B2 | 8/2007 | Ho |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,527,208 B2 | 5/2009 | Hammad |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |

(56) References Cited

U.S. PATENT DOCUMENTS

| | | |
|---|---|---|
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,276,814 B1 | 10/2012 | Davis |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,346,670 B2 | 1/2013 | Hasson |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,511,547 B2 | 8/2013 | Rans |
| 8,519,822 B2 | 8/2013 | Riegebauer |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,870,081 B2 | 10/2014 | Olson |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,893 B2 | 5/2015 | Kirkham |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,199 B2 | 9/2015 | Spodak |
| 9,129,280 B2 | 9/2015 | Bona et al. |
| 9,152,832 B2 | 10/2015 | Royston et al. |
| 9,183,490 B2 | 11/2015 | Moreton |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,275,325 B2 | 3/2016 | Newcombe |
| 9,286,606 B2 | 3/2016 | Diamond |
| 9,306,626 B2 | 4/2016 | Hall et al. |
| 9,306,753 B1 | 4/2016 | Vandervort et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,501,776 B2 | 11/2016 | Martin |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,744 B2 | 7/2017 | Wurmfeld |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,949,065 B1 | 4/2018 | Zarakas |
| 9,953,323 B2 | 4/2018 | Candelore et al. |
| 9,961,194 B1 | 5/2018 | Wiechman et al. |
| 9,965,632 B2 | 5/2018 | Zarakas |
| 9,965,756 B2 | 5/2018 | Davis et al. |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld et al. |
| 9,990,795 B2 | 6/2018 | Wurmfeld |
| 10,007,873 B2 | 6/2018 | Heo |
| 10,013,693 B2 | 7/2018 | Wyatt |
| 10,043,164 B2 | 8/2018 | Dogin et al. |
| 10,075,437 B1 | 9/2018 | Costigan et al. |
| 10,121,130 B2 | 11/2018 | Pinski |
| 10,129,648 B1 | 11/2018 | Hernandez et al. |
| 10,133,979 B1 | 11/2018 | Eidam et al. |
| 10,210,505 B2 | 2/2019 | Zarakas |
| 10,217,105 B1 | 2/2019 | Sangi et al. |
| 10,242,368 B1 | 3/2019 | Poole |
| 10,296,910 B1 | 5/2019 | Templeton |
| 10,332,102 B2 | 6/2019 | Zarakas |
| 10,360,557 B2 | 7/2019 | Locke |
| 10,380,471 B2 | 8/2019 | Locke |
| 10,395,244 B1 | 8/2019 | Mossler |
| 10,453,054 B2 | 10/2019 | Zarakas |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,489,781 B1 | 11/2019 | Osborn |
| 10,510,070 B2 | 12/2019 | Wurmfeld |
| 10,515,361 B2 | 12/2019 | Zarakas |
| 10,535,068 B2 | 1/2020 | Locke |
| 10,546,444 B2 | 1/2020 | Osborn |
| 10,581,611 B1 | 3/2020 | Osborn |
| 10,664,830 B1 | 5/2020 | Rule |
| 10,685,349 B2 | 6/2020 | Brickell |
| 10,797,882 B2 | 10/2020 | Rule |

(56)                References Cited

U.S. PATENT DOCUMENTS

| | | | |
|---|---|---|---|
| 10,880,741 B2 | 12/2020 | Zarakas |
| 10,909,525 B1 | 2/2021 | Dhodapkar |
| 10,970,691 B2 | 4/2021 | Koeppel |
| 10,984,416 B2 | 4/2021 | Ilincic |
| 11,037,136 B2 | 6/2021 | Rule |
| 11,062,098 B1 | 7/2021 | Bergeron |
| 11,120,453 B2 | 9/2021 | Rule |
| 11,138,593 B1 | 10/2021 | Ho |
| 11,138,605 B2 | 10/2021 | Aabye |
| 11,176,540 B2 | 11/2021 | Gupta |
| 11,188,908 B2 | 11/2021 | Locke |
| 11,216,806 B2 | 1/2022 | Mossler |
| 11,297,958 B2 | 4/2022 | Vukich |
| 11,334,872 B2 | 5/2022 | Phillips |
| 11,361,173 B2 | 6/2022 | Edwards |
| 11,392,933 B2 | 7/2022 | Mossler |
| 11,392,935 B2 | 7/2022 | Suresh |
| 11,416,844 B1 | 8/2022 | Osterkamp |
| 11,423,392 B1 | 8/2022 | Ho |
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 | 1/2023 | Cook |
| 11,556,918 B2 | 1/2023 | Mestre |
| 11,615,395 B2 | 3/2023 | McHugh |
| 11,777,933 B2 | 10/2023 | Moreton |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2003/0220876 A1 | 11/2003 | Burger et al. |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0228997 A1 | 10/2005 | Bicker |
| 2005/0247797 A1 | 11/2005 | Ramachandran |
| 2005/0269402 A1 | 12/2005 | Spitzer et al. |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0276765 A1 | 11/2007 | Hazel et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0082452 A1 | 4/2008 | Wankmueller et al. |
| 2008/0086767 A1 | 4/2008 | Kulkarni et al. |
| 2008/0099552 A1 | 5/2008 | Grillion |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0155801 A1 | 6/2011 | Rowberry |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |

(56) References Cited

U.S. PATENT DOCUMENTS

| | | |
|---|---|---|
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0030997 A1 | 1/2013 | Spodak et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef et al. |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365377 A1 | 12/2014 | Salama et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0073983 A1 | 3/2015 | Bartenstein et al. |
| 2015/0088757 A1 | 3/2015 | Zhou et al. |
| 2015/0089586 A1 | 3/2015 | Ballesteros |
| 2015/0113271 A1 | 4/2015 | Jooste et al. |
| 2015/0134452 A1 | 5/2015 | Williams |
| 2015/0134513 A1 | 5/2015 | Olson et al. |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0199863 A1 | 7/2015 | Scoggins et al. |
| 2015/0205379 A1 | 7/2015 | Mag et al. |
| 2015/0254637 A1 | 9/2015 | Yang |
| 2015/0302409 A1 | 10/2015 | Malek |
| 2015/0317295 A1 | 11/2015 | Sherry et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0029151 A1* | 1/2016 | Hara .................. H04W 4/80 455/41.1 |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0283922 A1* | 9/2016 | Jinno .................. G06Q 20/34 |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |

(56) References Cited

U.S. PATENT DOCUMENTS

| | | | |
|---|---|---|---|
| 2017/0068950 A1 | 3/2017 | Kwon | |
| 2017/0103388 A1 | 4/2017 | Pillai et al. | |
| 2017/0104739 A1 | 4/2017 | Lansler et al. | |
| 2017/0109509 A1 | 4/2017 | Baghdasaryan | |
| 2017/0109730 A1 | 4/2017 | Locke et al. | |
| 2017/0116447 A1 | 4/2017 | Cimino et al. | |
| 2017/0124568 A1 | 5/2017 | Moghadam | |
| 2017/0140379 A1 | 5/2017 | Deck | |
| 2017/0154328 A1 | 6/2017 | Zarakas et al. | |
| 2017/0154333 A1 | 6/2017 | Gleeson et al. | |
| 2017/0180134 A1 | 6/2017 | King | |
| 2017/0230189 A1 | 8/2017 | Toll et al. | |
| 2017/0237301 A1 | 8/2017 | Elad et al. | |
| 2017/0289127 A1 | 10/2017 | Hendrick | |
| 2017/0295013 A1 | 10/2017 | Claes | |
| 2017/0316696 A1 | 11/2017 | Bartel | |
| 2017/0317834 A1 | 11/2017 | Smith et al. | |
| 2017/0330173 A1 | 11/2017 | Woo et al. | |
| 2017/0374070 A1 | 12/2017 | Shah et al. | |
| 2018/0034507 A1 | 2/2018 | Wobak et al. | |
| 2018/0039986 A1 | 2/2018 | Essebag et al. | |
| 2018/0039987 A1 | 2/2018 | Molino | |
| 2018/0068316 A1 | 3/2018 | Essebag et al. | |
| 2018/0129945 A1 | 5/2018 | Saxena et al. | |
| 2018/0160255 A1 | 6/2018 | Park | |
| 2018/0191501 A1 | 7/2018 | Lindemann | |
| 2018/0205712 A1 | 7/2018 | Versteeg et al. | |
| 2018/0240106 A1 | 8/2018 | Garrett et al. | |
| 2018/0254909 A1 | 9/2018 | Hancock | |
| 2018/0268132 A1 | 9/2018 | Buer et al. | |
| 2018/0270214 A1 | 9/2018 | Caterino et al. | |
| 2018/0294959 A1 | 10/2018 | Traynor et al. | |
| 2018/0300716 A1 | 10/2018 | Carlson | |
| 2018/0302396 A1 | 10/2018 | Camenisch et al. | |
| 2018/0315050 A1 | 11/2018 | Hammad | |
| 2018/0316666 A1 | 11/2018 | Koved et al. | |
| 2018/0322486 A1 | 11/2018 | Deliwala et al. | |
| 2018/0359100 A1 | 12/2018 | Gaddam et al. | |
| 2019/0014107 A1 | 1/2019 | George | |
| 2019/0019375 A1 | 1/2019 | Foley | |
| 2019/0036678 A1 | 1/2019 | Ahmed | |
| 2019/0172055 A1 | 6/2019 | Hale | |
| 2019/0238517 A1 | 8/2019 | D'Agostino et al. | |
| 2019/0303945 A1 | 10/2019 | Mitra | |
| 2021/0004806 A1 | 1/2021 | Noe | |
| 2021/0019735 A1 | 1/2021 | Hart et al. | |
| 2021/0021305 A1 | 1/2021 | Rule et al. | |
| 2021/0073790 A1* | 3/2021 | Hart | G06T 7/579 |
| 2021/0272098 A1 | 9/2021 | Delsuc et al. | |
| 2021/0304189 A1 | 9/2021 | Gupta | |
| 2021/0383360 A1 | 12/2021 | Sinha | |
| 2021/0406869 A1 | 12/2021 | Pathrabe | |
| 2022/0114581 A1 | 4/2022 | Upadhye | |
| 2022/0284416 A1 | 9/2022 | Rule | |
| 2022/0309509 A1 | 9/2022 | Akgun | |
| 2022/0335412 A1 | 10/2022 | Rule | |
| 2022/0366410 A1 | 11/2022 | Rule | |
| 2022/0398566 A1 | 12/2022 | Rule | |
| 2022/0414648 A1 | 12/2022 | Rule | |
| 2023/0054157 A1 | 2/2023 | Mao | |
| 2023/0065163 A1 | 3/2023 | Vargas | |
| 2023/0083785 A1 | 3/2023 | Maiman | |
| 2023/0169505 A1 | 6/2023 | Rule | |
| 2023/0354020 A1 | 11/2023 | Rule | |
| 2023/0359839 A1 | 11/2023 | Lovgren | |
| 2025/0053979 A1* | 2/2025 | Pick | G06Q 20/3229 |

FOREIGN PATENT DOCUMENTS

| | | | |
|---|---|---|---|
| CN | 103023643 | | 4/2013 |
| CN | 103417202 | | 12/2013 |
| EP | 1 085 424 | | 3/2001 |
| EP | 1 223 565 | | 7/2002 |
| EP | 1 265 186 | | 12/2002 |
| EP | 1 783 919 | | 5/2007 |
| EP | 2 852 070 | | 1/2009 |
| EP | 2 139 196 | | 12/2009 |
| EP | 1 469 419 | | 2/2012 |
| GB | 2 457 221 | | 8/2009 |
| GB | 2 516 861 | | 2/2015 |
| GB | 2 551 907 | | 1/2018 |
| KR | 101508320 | | 4/2015 |
| KR | 20150140132 | A | 12/2015 |
| WO | 199910824 | A1 | 3/1999 |
| WO | WO 00/49586 | | 8/2000 |
| WO | WO 2006070189 | | 7/2006 |
| WO | WO 2008055170 | | 5/2008 |
| WO | WO 2009025605 | | 2/2009 |
| WO | WO 2010049252 | | 5/2010 |
| WO | WO 2011112158 | | 9/2011 |
| WO | WO 2012001624 | | 1/2012 |
| WO | WO 2013039395 | | 3/2013 |
| WO | WO 2013155562 | | 10/2013 |
| WO | WO 2013192358 | | 12/2013 |
| WO | WO 2014043278 | | 3/2014 |
| WO | WO 2014170741 | | 10/2014 |
| WO | WO 2015179649 | | 11/2015 |
| WO | WO 2015183818 | | 12/2015 |
| WO | WO 2016097718 | | 6/2016 |
| WO | WO 2016160816 | | 10/2016 |
| WO | WO 2016168394 | | 10/2016 |
| WO | 2017047855 | A1 | 3/2017 |
| WO | WO 2017042375 | | 3/2017 |
| WO | WO 2017042400 | | 3/2017 |
| WO | WO 2017157859 | | 9/2017 |
| WO | WO 2017208063 | | 12/2017 |
| WO | WO 2018063809 | | 4/2018 |
| WO | WO 2018137888 | | 8/2018 |
| WO | 2019022585 | A1 | 1/2019 |
| WO | 2021051884 | A1 | 3/2021 |
| WO | 2021133492 | A1 | 7/2021 |
| WO | 2022108959 | A1 | 5/2022 |
| WO | 2022187350 | A1 | 9/2022 |
| WO | 2023017943 | A1 | 2/2023 |
| WO | 2023064063 | A1 | 4/2023 |

OTHER PUBLICATIONS

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application, International Journal of Advanced Computer Science and Applications," vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifications for Payment Systems, Book 2, Security and Key Management," Version 3.4, [online] 2011 [retrieved on Mar. 25, 2019]. Retrieved from

(56)　　　　References Cited

OTHER PUBLICATIONS

Internet URL: https://www.emvco.com/wp-content/uploads/2017/05/EMV_v4.3_Book_2_Security_and_Key_Management_20120607061923900.pdf, 174 pages.

Author unknown, "NFC Guide: All You Need to Know About Near Field Communication" Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K, "Goldbug Big Seven open source crypto-messengers to be compared—: or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song, F., and Yun, A.l, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.

Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone" Conference paper (2013) IEEE AFRICON at Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author unknown: "onetappayment™", [online] Jan. 24, 2019, [retrieved on Mar. 25, 2019]. Retrieved from Internet URL: https://www.payubiz.in/onetap, 4 pages.

Vu et al., (2012). "Distinguishing users with capacitive touch communication" Proceedings of the Annual International Conference on Mobile Computing and Networking, MOBICOM. 10.1145/2348543.2348569.

EMVCo, EMV Card Personalization Specification, version 1.0 (Jun. 2003), 81 pages.

Ullmann et al., (2012). "On-Card User Authentication for Contactless Smart Cards based on Gesture Recognition", LNI, 223-234, 12 pages.

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

Author Unknown, "EMV Integrated Circuit Card Specifcations for Payment Systems, Book 2, Security and Key Management," Version 4.3 [online] 2011 [retrieved on Mar. 25, 2019]. Retrieved from Internet URL.

Smart Card Alliance, "Co-Branded Multi-Application Contactless Cards for Transit and Financial Payment," A Smart Card Alliance Transportation Council White Paper (40 pages), Mar. 2008.

Emvco: "EMV Card Personalisation Specification", Aug. 1, 2021, pp. 1-114, Retrieved from the Internet: URL: https://www.emvco.com/specification/?post_id=12467.

The International Search Report and Written Opinion mailed Feb. 24, 2025 for corresponding PCT/US2024/055474 (16 pages).

Saush, "Getting information from an EMV chip card with Java," Sep. 8, 2006, WordPress, pp. 1-13.

Author Unknown, "Global expansion of card tapping mobile OTP for security and convenience is imminent," Jun. 28, 2022, website: https://www.swidch.com/blogs/card-tapping-motp-blog.

* cited by examiner 100
120
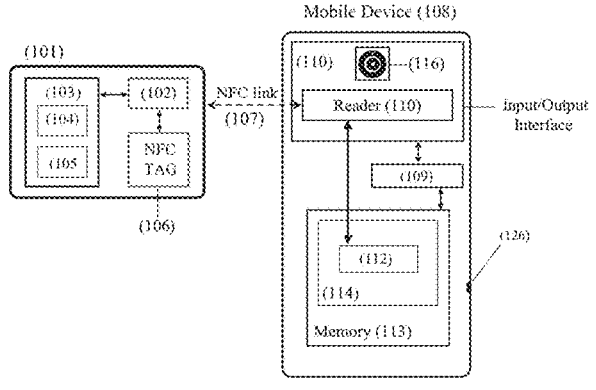
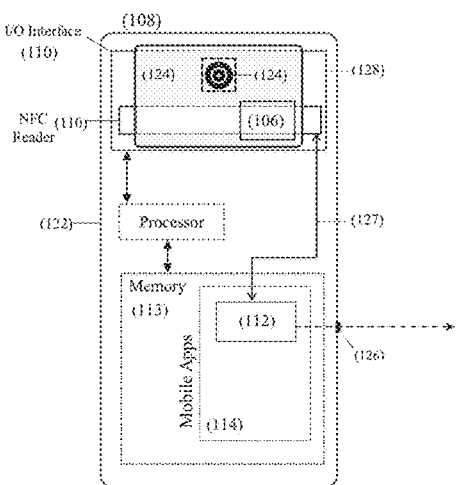
FIG. 1A
FIG. 1B

<u>200</u>

400

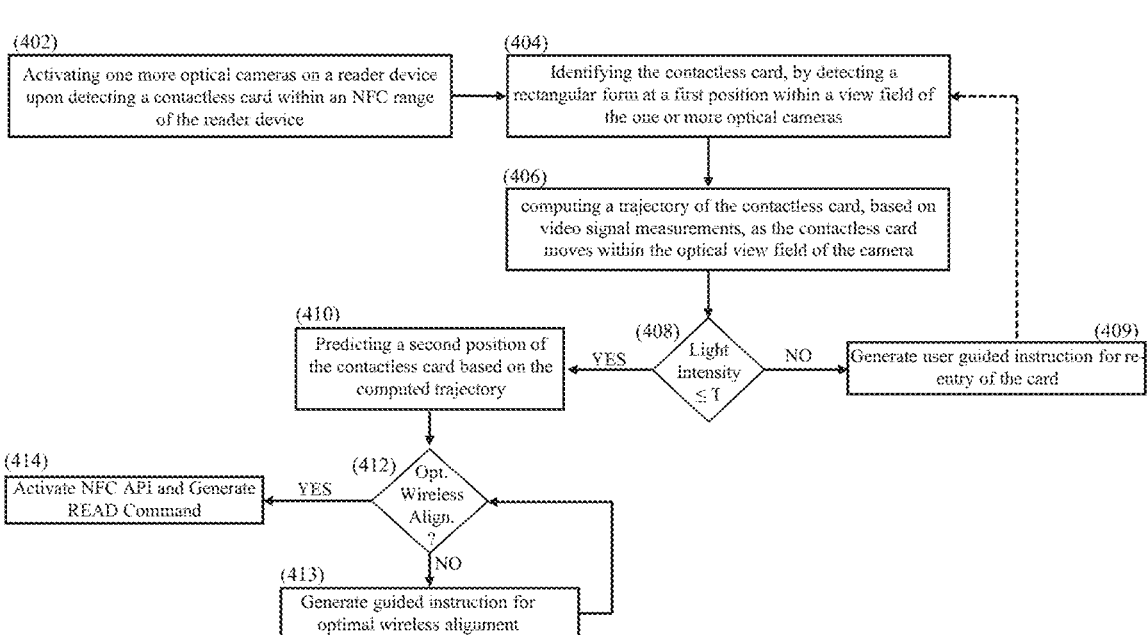

(402)
Activating one more optical cameras on a reader device upon detecting a contactless card within an NFC range of the reader device (404)
Identifying the contactless card, by detecting a rectangular form at a first position within a view field of the one or more optical cameras (406)
computing a trajectory of the contactless card, based on video signal measurements, as the contactless card moves within the optical view field of the camera (408)
Light Intensity ≤ T (409)
Generate user guided instruction for re-entry of the card (410)
Predicting a second position of the contactless card based on the computed trajectory

YES

NO (412)
Opt. Wireless Align. ?

(414)
Activate NFC API and Generate READ Command

YES (413)
Generate guided instruction for optimal wireless alignment

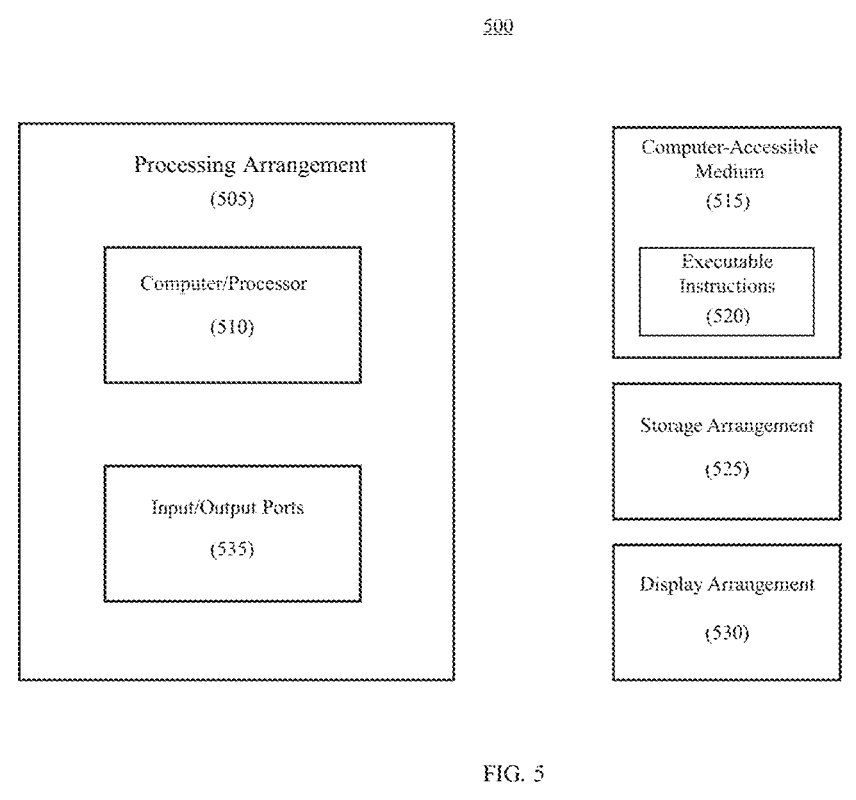

Processing Arrangement
(505)

Computer/Processor
(510)

Input/Output Ports
(535)

Computer-Accessible
Medium
(515)

Executable
Instructions
(520)

Storage Arrangement
(525)

Display Arrangement
(530)

FIG. 5

SYSTEMS AND METHODS FOR OPTIMIZING SHORT-RANGE WIRELESS READ OF CONTACTLESS CARDS USING VIDEO SIGNAL

FIELD OF THE DISCLOSURE

The present disclosure is generally related to proximity-based wireless communication and more specifically to optimizing near-field communication (NFC) in contactless cards using sensor-based guidance.

BACKGROUND

One important aspect of optimizing near-field communication with contactless cards, is based on a positional alignment provided between an NFC transceiver (e.g., an antenna and/or conductive coil integrated into a card chip) of the contactless card and the reading device. Establishing an optimal positional alignment for performing a wireless data transfer (e.g., via NFC read and/or write commands) may sometimes involve manual adjustments by the user to find the optimal position for wireless communication. However, these manual adjustments can be time-consuming and may not always result in the desired alignment.

These and other deficiencies exist. As such, there is a need for an improved system and process for accurate automation of the alignment process required for optimizing short-range wireless communication between a contactless card and a NFC reader unit of a user device.

SUMMARY OF THE DISCLOSURE

In some aspects, the techniques described herein relate to a device for optimizing near-field communication with a contactless card, the device including: a processor; a memory storing one or more applications, the one or more applications including a wireless intermediary application; a plurality of sensors including one or more optical cameras; and a communication interface configured to create a communication field; wherein, upon entry of a contactless card within the communication field, the intermediary wireless application is configured to: activate the one or more optical cameras; process, a video signal from the one or more optical cameras to: identify the contactless card, based on detection of a rectangular form at a first position within a view field of the one or more optical cameras; determine, based on a light sensor output associated with the device, a light intensity value associated with the view field including the contactless card, compute a trajectory of the contactless card, based on one or more transitions in the light intensity value, as the contactless card moves within the view field of the one or more optical cameras; predict, upon detecting the light intensity value dropping below an intensity threshold, a second position of the contactless card based on the trajectory; initiate, upon determining that the second position of the contactless card corresponds to an optimal wireless alignment with the receiving device, a wireless scanning process; generate, upon determining that the second position of the contactless card does not corresponds to an optimal wireless alignment, one or more user notifications with respect to the optimal wireless alignment.

In some aspects, the techniques described herein relate to a method of optimizing near-field communications with a contactless card, the method including: activating one more optical cameras on a reader device upon detecting a contactless card within a near-field communication range of the reader device; identifying the contactless card, by detecting a rectangular form at a first position within a view field of the one or more optical cameras; determining, based on a light sensor output associated with the reader device, a light intensity value associated with the view field including the contactless card; computing a trajectory of the contactless card, based on one or more transitions in the light intensity value, as the contactless card moves within the view field of the first and the second optical sensors; predicting, upon detecting the light intensity value dropping below an intensity threshold value, a second position of the contactless card based on the trajectory; initiating, upon determining that the second position of the contactless card corresponds to an optimal wireless alignment with the receiving device, a wireless scanning process associated with the device; generating, upon determining that the second position of the contactless card does not corresponds to an optimal wireless alignment, one or more user notifications with respect to the optimal wireless alignment.

In some aspects, the techniques described herein relate to a non-transitory computer-accessible medium including instructions for execution by a computer hardware arrangement, wherein, upon execution of the instructions the computer hardware arrangement performs procedures including: activating one more optical cameras on a reader device upon detecting a contactless card within a near-field communication range of the reader device; identifying the contactless card, by detecting a rectangular form at a first position within a view field of the one or more optical cameras; determining, based on a light sensor output associated with the reader device, a light intensity value associated with the view field including the contactless card; computing a trajectory of the contactless card, based on one or more transitions in the light intensity value, as the contactless card moves within the view field of the first and the second optical sensors; predicting, upon detecting the light intensity value dropping below an intensity threshold value, a second position of the contactless card based on the trajectory; initiating, upon determining that the second position of the contactless card corresponds to an optimal wireless alignment with the receiving device, a wireless scanning process associated with the device; generating, upon determining that the second position of the contactless card does not corresponds to an optimal wireless alignment, one or more user notifications with respect to the optimal wireless alignment.

BRIEF DESCRIPTION OF THE DRAWINGS

FIG. 1A and FIG. 1B illustrate proximity-based wireless connectivity for enabling NFC-enabled communication with a contactless card, in accordance to some embodiments of the present disclosure.

FIG. 4 illustrates an exemplary operational flow diagram for implementing card placement to maximize a probability of a successful NFC read, in accordance to some embodiments of the present disclosure.

FIG. 5 illustrates a block diagram of an exemplary system, in accordance with some embodiments of the present disclosure.

DETAILED DESCRIPTION

Figure 2:
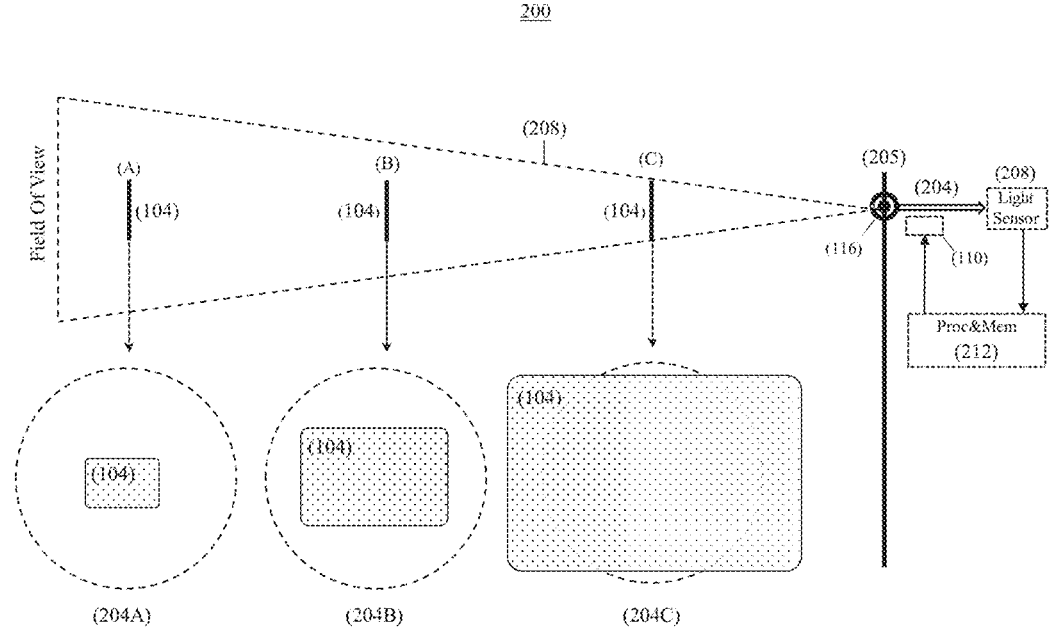
FIG. 2 is an example overview showing a video signal, from a camera unit, encoding a relative position of the card within the optical field of view (FOV) as a function of FOV obstruction, in accordance to some embodiments of the present disclosure.

The following description of exemplary embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Furthermore, the described features, advantages, and characteristics of the exemplary embodiments may be combined in any suitable manner. One skilled in the relevant art will recognize that the embodiments may be practiced without one or more of the specific features or advantages of an embodiment. In other instances, additional features and advantages may be recognized in certain embodiments that may not be present in all embodiments. One skilled in the relevant art will understand that the described features, advantages, and characteristics of any embodiment can be interchangeably combined with the features, advantages, and characteristics of any other embodiment.

A near-field communication (NFC) functionality, integrated into a user device, may be controlled by an NFC application programming interface (API) executing on a user device. (e.g., iPhone®). One aspect of the present disclosure is directed to a novel implementation of the NFC reading process for improving efficiency and resource utilization associated with such process. In particular, one aspect of the disclosed solution is based on increasing a probability of a successful NFC read. This may be achieved by automating a positional alignment process between an NFC tag on a contactless card (e.g., an antenna and/or conductive coil integrated into a card chip) and a NFC reader unit on of user device, prior to initializing an NFC application and/or application programming interface (API) for executive a wireless read and/or write of the contactless card.

Accordingly, one aspect of the present disclosure is directed to optimizing operation of an NFC reading API based on a triggering condition associated with an optimal placement of the contactless card, to thereby increase a probability of a successful exchange of NFC-transmittable data (e.g., NFC read and/or write of the contactless card). In some embodiments, a camera unit may be used for capturing consecutive images and/or a video of the contactless card as the card is tapped against a reader. The captured data may then be analyzed to determine a landing position and orientation of the contactless card during a tap-based read action which involves the card to be placed against the reading surface of the reader device (e.g., a user mobile device). Accordingly a positioning signal generated from the aforementioned arrangement may be utilized to trigger the NFC reading API executing on the mobile device and initiating a NFC read process, so as to increase the probability of a successful read.

Example 100, illustrated in FIG. 1A, provides an exemplary representation of a contactless card 101 configured with an NFC interface/tag 106 and a user mobile device 108 configured with an NFC reader unit 110. The contactless card may comprise an integrated processor 102 and memory 103 that may store, for example, user identifying and/or authenticating information as near field communication (NFC) transmittable data (e.g., NFC Data Exchange Format (NDEF)). The integrated memory 103 may store one or more applets 104 that may be communicatively coupled to one or more applications running on the user mobile device 108 (e.g. NFC reading application and/or API 112 for facilitating one or more wireless reads of the contactless card 101). The card-integrated memory 103 may also store an application transaction counter 105 to keep track of a proper sequence of read operations associated with the contactless card. The contactless card 101 may further comprise a Near Field Communication (NFC) interface 106 to facilitate NFC communication with an NFC reader (e.g., reader unit 110 of the user mobile device 108 via NFC link 107.) A wireless read of the contactless card may be performed by the reader unit 110 of the mobile user device 108, by bringing the contactless card within an NFC range of the mobile device (e.g., by tapping the contactless card on a reader of the user mobile device). Example 120 of FIG. 1B illustrates a physical positioning of the contactless card 104, and in particular NFC interface 106 of the contactless card against the NFC reader unit 110 of the user device 108 for establishing an optimal NFC connectivity (e.g., corresponding to NFC link 107) Upon establishing an NFC link, in accordance to the overlapping positional arrangement 120 of the contactless card NFC tag 106 and the reader unit 110 of the mobile device 108, NFC reading application/API 112 may be activated to initiate a wireless read, via the reader unit 110. Therefore, in some embodiments, activation of the NFC reading application/API 112 is contingent upon establishment of NFC link 107, based on the exemplary card placement 120. As illustrated in FIG. 1B, the alignment of the contactless NFC tag 106 with the NFC reader element 110 of the user device may result in the camera unit 116 being covered by the contactless card 106. Therefore a video signal generated by the camera unit 116 may be used to guide the placement of the contactless card based at least on one known signal point corresponding to a reduction of light intensity within the view field of the camera unit 116 (e.g., video feed going dark as substantial amount of light may be blocked off by the body of the card when placed in an optimal NFC alignment with respect to a front-facing surface of the mobile device 108.) As shown in FIG. 1B, upon detection of an optimal NFC alignment 120, an activation signal 127 may be transmitted to the NFC reading application 112. In response to the activation signal 127, NFC API 112 may generate an NFC read command which is transmitted via the NFC reader unit 126 to the NFC tag of the contactless card 124.

Referring back to FIGS. 1A and 1B, the user device 108, may include one or more processors 109 (e.g., one or more microprocessors), coupled to memory 113, which may be, for example, random access memory (RAM), read-only memory (ROM), programmable read-only memory (PROM), erasable programmable read-only memory (EPROM), and/or electrically erasable programmable read-only memory (EEPROM), and the user device 108 may include one or more of these memories. Memory 113 may include one or more applications 114, for facilitating NFC-based exchange of data with an external source within an NFC field of the mobile device. Accordingly the mobile device 108 may be configured for wireless communication with the contactless card 104 via a short-range wireless connection (e.g., NFC), and network communication, via a network interface 126 with one or more remote servers. The user mobile/computing device 108 may include a processor 109, a memory 113, and one or more applications 112. The processor 109 may be a processor, a microprocessor, or other processor, and the user device 108 may include one or more of these processors. The processor 109 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

As described above, the user device 108 may include a read-only memory 113. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 113 may be configured to store one or more software applications, such as applications 114, and other data, such as user's private data and financial account information. Applications 114 may comprise for example, a NFC reading application and/or API 112 and one or more banking and/or data collection applications with one or more Application Programming Interface (API) components. User (mobile) device 108 may further include one or more Input/Output (I/O) devices 128 for capturing user inputs and displaying one or more information records and/or notification messages to the user. For example, I/O devices 128 may include at least one display and input device. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user (mobile) device that is available and supported by the device, such as a touch-screen, keyboard, mouse, cursor-control device, touch-screen, microphone, digital camera, video recorder or camcorder. As shown in FIGS. 1A and 1B, I/O devices 128 of user device 128 may also include a camera unit 124. The I/O devices may be used to enter information and interact with the contactless card as described herein.

I/O devices 219, associated with the user device 122, may further include an electronic reader unit 126 for capturing information via one or more short range communications protocols such as Near Field Communication (NFC). The user device 108 may be configured to transmit one or more read instructions to the contactless card 101, via NFC link 107. The user device 108 may be a network-enabled computer device, with a network communication interface 126. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, or other network-enabled computing or communications devices. For example, network-enabled computing devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. It is further understood that the user (mobile) device may be of any type of device that supports the communication and display of data and user input. The present disclosure is not limited to a specific number of user devices, and it is understood that the system 300 may include a single client device or multiple client devices.

In accordance to one aspect of the present disclosure, the a signal source for tracking a trajectory of a card within a communication field (e.g., for maximum proximity-based communication) may involve a front facing camera 116 and the video signal feed 204 sourced therefrom. The illustrated example 200 shows a side view 205 of the user device 108. Information regarding a trajectory of the card within the optical FOV 208 of the camera unit 116 may be encoded into the video feed signal 204. Position points A, B and C correspond to varying positions of the contactless card 104 (illustrated as a side-view representation) as it moves through the optical FOV 208. Exemplary front-view representations of the optical FOV 208 at position points A, B and C are represented by 204A, 204B, 204C, in example 200 illustrated in FIG. 2. The exemplary FOV representations 204A, 204B, 204C correspond to the relative area of the optical FOV 208 covered by the contactless card 104 (e.g., relative size of the contactless card image within the FOV) at each position point A, B and C along a trajectory towards the reading surface of the mobile device 205 (e.g., an NFC reader element 110 disposed in proximity to camera unit 116).

Information regarding a trajectory of the card within the optical FOV 208 of the camera unit 116 may be encoded into the video feed signal 204. The encoded information may correspond to a variety of data points associated with varying positions of the contactless card 104 as it moves through the optical FOV 208, and may be used to compute a trajectory of the card and project a final placement against a reader unit 112 during a tap action (being executed a user). Various aspects of the video signal may be analyzed for determination of the final position of the card on the user device during a NFC read, executed via a tap action. In one example, changes in an intensity value of the video signal (e.g., light captured within the view field of the camera unit 116) may be used as a measure of distance away from the reader unit of the user device. For example, the FOV representations 204A-204C may be associated with different intensity measurements as a function of relative area obstructed by the contactless card at various points along its trajectory toward the reader unit 110. Taking the aforementioned output intensity readings as an NFC activation signature, a signal may be transmitted to and processed by the integrated processing and memory elements 212 of the reader device to identify the aforementioned NFC activation signature, to trigger the operation of the NFC reading API and perform the NFC read of the contactless car 104 with the NFC reader unit 110. The described proximity-based triggering scheme is associated with an increase in the likelihood of a successful read of the contactless card 104 by the reader unit 110 of the mobile communication device 108.

In some embodiments, video feed 204, associated with the optical FOV 208, may be processed for average intensity values associated with various crossing points (e.g., A, B, C). As described above, the processing may be performed by an integrated processing and memory elements 212. The NFC data transfer command may then be transmitted to the NFC reader element of the mobile device. If the final placement, as indicated by an intensity measurement of the video signal 204, corresponds to placement position shown in example 120 of FIG. 1B, an NFC Read and/or write operation may be carried out by the reader unit 110. In some embodiments, the camera unit 116 may be automatically activated by the integrated processing unit 212, upon detection of an NFC tag within a communication field generated by the user device 108.

Another exemplary implementation may use information regarding a degree of image resolution and/or focus as an indicator of proximity and projection of landing point, for the contactless card, against the NFC reader unit 110. In exemplary embodiment 200, position A may correspond to a card to camera distance (i.e. distance between the object and the camera lens) at which a rectangular form of the card is first detected and recognized by the video signal processing unit 212. Position point B may correspond to the working distance (WD) where the captured card image is at its sharpest focus. Position point C may correspond to a maximum range where the card image appears to be in acceptable focus (e.g., representing a depth of field (DoF) of the camera). In some embodiments, position point A may correspond to the working distance at which the card image is in full focus, position point B may correspond to the depth of field distance at which the image is out of focus, and position point C may correspond to the distance at a which the video feed goes dark (e.g., camera aperture being substantially covered by the contactless card.) By detecting one or more video signal attributes corresponding to the varying position of the contactless card within the optical FOV of the camera unit, a determination can be made as to the final landing position of the contactless card against a reading surface of the mobile device 108.

As a landing position of the contactless card may depend upon varying paths to the reading surface, analysis of the video signal may further encode any deviations in the trajectory of the card. The trajectory information may be stored and analyzed by the integrated processing and memory element 212 to compute trajectories most likely associated with successful NFC reads of the contactless card, based on recorded data during each NFC read attempt performed by a user. In some embodiments a mathematical function may be fitted to the data for determination of optimal paths (e.g., paths resulting in a landing position against the reading surface of the mobile device which corresponds to an optimal NFC proximity between the card's NFC tag and the NFC reader unit).

Figure 3:
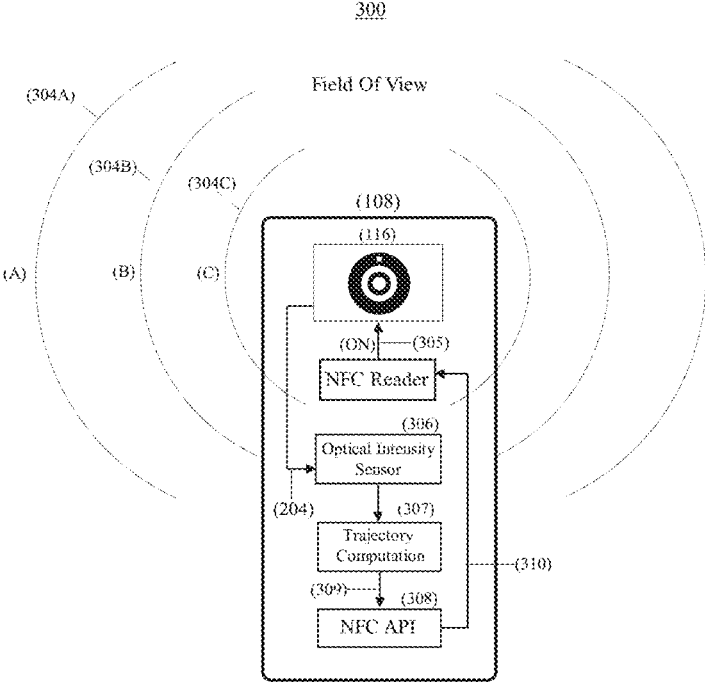
FIG. 3 illustrates an operational overview for proximity-based activation of a mobile NFC application, using a camera feed signal for detection of an optimal card placement, in accordance to some embodiments of the present disclosure.

FIG. 3 illustrates an exemplary processing arrangement for computing a placement of the contactless card based on the video signal 204 generated by the camera unit 116. The NFC scanning process may be automatically enabled upon activating a user communication device (e.g., responsive to unlocking of the screen). Once the NFC scanning process is initiated, a detection of a NFC tag within the NFC field of the user device, may trigger the front camera unit 116 to be switched on, as shown by the camera ON signal 305. A video signal 204 generated by the front camera unit 116 of the user device 108 may then be used for tracking a trajectory of the contactless card. In some embodiments, the position of the card may be tracked with respect to a narrowing FOV 304A 304B and 304C corresponding to card positions A, B and C, respectively. FOV representation 304A-304C correspond to an approximate representation of the relative two dimensional area of the optical FOV encompassing the contactless card along various approach points, corresponding to card position at points A, B and C.

Video signal measurements corresponding to optical FOV (304A-304C) at card positions A, B and C respectively, may be fed into an optical intensity sensor and/or light sensor 306. Other attribute computed, from the video signal 204, based on movement of the card within the optical FOV of the camera unit may correspond to relative dimensions of the card's image with respect to the shrinking cross-section of the FOV (e.g., as illustrated by relative FOV representations 304A-304C) as the card moves towards the NFC reading unit disposed in proximity to the camera unit 116. The measurements corresponding to various video signal attributes measured by the light sensor 306, may then be fed into a trajectory computing process/module 307. The trajectory computation process/module 307 may process various video signal attributes (e.g., card image dimensions, image resolution/focus and/or optical intensity measurements) as an indicator of trajectory, to determine a placement of the contactless NFC tag against the NFC reader unit of the user device 108, when the video feed goes dark. Based on trajectory computations culminating in a drop in video signal intensity below a threshold value (as an indicator that the camera unit is fully covered by the contactless card) a predicted final placement of the card upon the reading surface of the user device may be determined. Once optimal placement for establishing a proximity-based NFC link is determined, the NFC reading API 308, stored on the user device 108, may be activated (e.g., communication path 309) to facilitate the NFC read and/or write operation, via the NFC reader unit of the user device, of the contactless card, as illustrated by communication path 310.

In some embodiments, camera unit 116 may be turned on based on detection of user activities that have been correlated with contactless reading of the card, based on historical data archived by the mobile device 108. Furthermore, previously recorded user behavior data associated with NFC read of the contactless card may be analyzed, using machine learning, to enhance the process for automating activation of the front-facing camera and improving prediction of a final placement. In some embodiments, previously tracked movements of the card within the optical view field that have resulted in successful, unsuccessful, and/or interrupted reads of the contactless card may be stored and used for determining an optimal placement based on a computed trajectory. In some embodiments, a misalignment of the card's NFC tag and the reader unit of the mobile device may trigger one or more user feedback notifications for correcting a placement of the card. The user feedback data may comprise visual and/or audio instructions to guide the user in correcting NFC alignment between the contactless card and a reading surface of the mobile device.

FIG. 4 illustrates an exemplary operation flow diagram 400 for implementing optimal proximity-based placement, for maximizing NFC connectivity between a contactless card and a reader unit of a user device, using a video signal feed from an integrated camera unit. The exemplary process is operative to trigger an NFC data transfer upon determining an optimal alignment between the NFC tag of the contactless card and the NFC reader of the user device. The video signal is used to facilitate a card placement conducive to optimal proximity-based communication of NFC data. As shown by the process flow 400, step 402 of the process corresponds to activation of one more optical cameras on the user device upon detecting a contactless card within an NFC range of the user device (e.g., the user device serving as a NFC reader.) Upon activation of the camera unit, the process may move to step 404 for identifying the contactless card, by detecting a rectangular form at a first position within a view field of the one or more optical cameras. Based on a successful identification of the rectangular form associated with the contactless card, at step 404, the process moves to step 406 for computing a trajectory of the contactless card based on one or more light sensor output values (e.g., the light sensor associated with the camera unit) measured at various positions, as the contactless card is moved within the optical FOV of the camera (e.g., during a tap action) towards a NFC reading surface of the user device. In some embodiments, the light sensor output values may correspond to various transitions in the light intensity value, as the contactless card moves within the optical view field of the camera. In some embodiments, the light sensor output values may correspond to variation in one or more dimensions of the card image and/or image resolution/focus as the card moves, within the optical view field of the camera, towards a NFC reading surface of the user device.

At step 408, the process may determine whether light intensity value (e.g., light sensor output value) has dropped below a threshold intensity value T (e.g., video feed has gone dark). If the light intensity value is above the threshold value T, user guidance instructions may be generated at step 409. The user guided information may prompt for a re-entry of the card into the optical FOV of the camera unit, such that a final landing placement of the card covers the camera unit. In some embodiments the user guidance instructions 409 may require a user to re-try the tapping action in which case the process may re-execute steps 404 and 406, until a light intensity measurement at step 408 is determined to be below threshold level T.

Upon determining a below-threshold intensity value at step 408, the process may move to step 410 for predicting a second position (e.g., projected landing position/placement) for the contactless card based on the trajectory computations performed at step 406. If the second position of the contactless card, based on projected placement corresponds to an optimal NFC alignment, the process may move to step 414 for activating an NFC API resulting in generation and transmission of one or more NFC read and/or write commands, via the reader unit of the user device, to the contactless card. If at step 412 an optimal wireless alignment is not achieved, user guidance instruction may be generated, at step 413, to prompt the user to adjust a positioning of the contactless until an optimal alignment for performing an NFC read and/or write of the contactless card is detected, at which point the NFC reading API is activated as described with respect to step 414.

In some embodiment feedback instruction for providing card placement guidance may correspond to auditory signal directing the user to move the card with respect to the reading surface of the reader device.

FIG. 5 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement 505 may be configured for computing a trajectory of the contactless within an optical FOV generated by a camera unit of user device and projecting a final placement of the contactless against a reader unit of the user device at a point at which the camera feed goes dark). Such processing and/or computing arrangement 505 can be, for example entirely or a part of, or include, but not limited to, a computer and/or processor 510 that can include, for example one or more microprocessors, and use instructions stored on a computer-accessible medium (e.g., RAM, ROM, hard drive, or other storage device).

As shown in FIG. 5, for example a computer-accessible medium 515 (e.g., as described herein above, a storage device such as a hard disk, floppy disk, memory stick, CD-ROM, RAM, ROM, etc., or a collection thereof) can be provided (e.g., in communication with the processing arrangement 505). The computer-accessible medium 515 can contain executable instructions 520 thereon. In addition or alternatively, a storage arrangement 525 can be provided separately from the computer-accessible medium 515, which can provide the instructions to the processing arrangement 505 so as to configure the processing arrangement to execute the exemplary procedures, processes, and methods, as described herein above, for example.

Further, the exemplary processing arrangement 505 can be provided with or include an input and/or output ports 535, which can include, for example a wired network, a wireless network, the internet, an intranet, a data collection probe, a sensor, etc. As shown in FIG. 5, the exemplary processing arrangement 505 can be in communication with an exemplary display arrangement 530, which, according to certain exemplary embodiments of the present disclosure, can be a touch-screen configured for inputting information to the processing arrangement in addition to outputting information from the processing arrangement, for example. Further, the exemplary display arrangement 530 and/or a storage arrangement 525 can be used to display and/or store data in a user-accessible format and/or user-readable format.

As used herein, the term "card" is not limited to a particular type of card. Rather, it is understood that the term "card" can refer to a contact-based card, a contactless card, or any other card, unless otherwise indicated. It is further understood that the present disclosure is not limited to cards having a certain purpose (e.g., payment cards, gift cards, identification cards, membership cards, transportation cards, access cards), to cards associated with a particular type of account (e.g., a credit account, a debit account, a membership account), or to cards issued by a particular entity (e.g., a commercial entity, a financial institution, a government entity, a social club). Instead, it is understood that the present disclosure includes cards having any purpose, account association, or issuing entity.

Systems and methods described herein can provide a system and configuration for performing an optimal NFC read of a contactless card by a reader device. Once a NFC link is established the wireless connectivity between the contactless card and the reader can permit, without limitation, financial transactions (e.g., credit card and debit card transactions), account management transactions (e.g., card refresh, card replacement, and new card addition transactions), membership transactions (e.g., joining and departing transactions), point of access transactions (e.g., building access and secure storage access transactions), transportation transactions (e.g., ticketing and boarding transactions), and other transactions.

In some aspects, the techniques described herein relate to a device for optimizing near-field communication with a contactless card, the device including: a processor; a memory storing one or more applications, the one or more applications including a wireless intermediary application; a plurality of sensors including one or more optical cameras; and a communication interface configured to create a communication field; wherein, upon entry of a contactless card within the communication field, the intermediary wireless application is configured to: activate the one or more optical cameras; process, a video signal from the one or more optical cameras to: identify the contactless card, based on detection of a rectangular form at a first position within a view field of the one or more optical cameras; determine, based on a light sensor output associated with the device, a light intensity value associated with the view field including the contactless card, compute a trajectory of the contactless card, based on one or more transitions in the light intensity value, as the contactless card moves within the view field of the one or more optical cameras; predict, upon detecting the light intensity value dropping below an intensity threshold, a second position of the contactless card based on the trajectory; initiate, upon determining that the second position of the contactless card corresponds to an optimal wireless alignment with the receiving device, a wireless scanning process; generate, upon determining that the second position of the contactless card does not corresponds to an optimal wireless alignment, one or more user notifications with respect to the optimal wireless alignment.

In some aspects, the techniques described herein relate to a device, wherein the trajectory of the contactless card is computed using a relative size of the rectangular form within a viewing frame associated with the viewing field.

In some aspects, the techniques described herein relate to a device, wherein the trajectory of the contactless card is computed stereoscopically using at least two distinct optical sensors on the device.

In some aspects, the techniques described herein relate to a device, wherein the plurality of sensors include one or more infrared cameras, and wherein the trajectory of the contactless card is computed using the one or more infrared cameras.

In some aspects, the techniques described herein relate to a device, wherein the first position corresponds to first instance of the detection of the rectangular form associated with the contactless card, in the view field of the one or more optical cameras.

In some aspects, the techniques described herein relate to a device, wherein the optimal wireless alignment corresponds to a positioning of the contactless card relative to the device for maximizing a possibility of a successful wireless read of the contactless card by the device.

In some aspects, the techniques described herein relate to a device, wherein the intensity threshold corresponds to a predetermined number for the average pixel value associated with the view field of the one or more optical cameras.

In some aspects, the techniques described herein relate to a device, wherein the one or more transitions in the light intensity values are used to identify an out of focus attribute of an image of the contactless card as an indicator of proximity as the contactless card moves within the view field.

In some aspects, the techniques described herein relate to a device, wherein a prediction of the second position for initiating the wireless scanning process, is initiated by a sequence corresponding to a detection of the rectangular form, followed by an identification of the out of focus attribute, followed by the light sensor output value dropping below the intensity threshold.

In some aspects, the techniques described herein relate to a device, wherein the one or more user notifications corresponds to one or more auditory signals for providing alignment instructions.

In some aspects, the techniques described herein relate to a device, wherein a machine learning model is used to identify an in-correct placements of the contactless card relative to the device, based on a predicted pattern in a user's card usage behavior.

In some aspects, the techniques described herein relate to a device, wherein the machine learning model is trained using historical training data corresponding to previous sequences of operations associated with previous contactless card transactions.

In some aspects, the techniques described herein relate to a device, wherein the machine learning model is used to determine the in-correct placement of the contactless card relative to the device, in absence of the detection of the contactless card by the one or more optical cameras.

In some aspects, the techniques described herein relate to a device, wherein the device includes a mobile communication device.

In some aspects, the techniques described herein relate to a method of optimizing near-field communications with a contactless card, the method including: activating one more optical cameras on a reader device upon detecting a contactless card within a near-field communication range of the reader device; identifying the contactless card, by detecting a rectangular form at a first position within a view field of the one or more optical cameras; determining, based on a light sensor output associated with the reader device, a light intensity value associated with the view field including the contactless card; computing a trajectory of the contactless card, based on one or more transitions in the light intensity value, as the contactless card moves within the view field of the first and the second optical sensors; predicting, upon detecting the light intensity value dropping below an intensity threshold value, a second position of the contactless card based on the trajectory; initiating, upon determining that the second position of the contactless card corresponds to an optimal wireless alignment with the receiving device, a wireless scanning process associated with the device; generating, upon determining that the second position of the contactless card does not corresponds to an optimal wireless alignment, one or more user notifications with respect to the optimal wireless alignment.

In some aspects, the techniques described herein relate to a method, wherein the trajectory of the contactless card is computed using a relative size of the rectangular form within a viewing frame associated with the viewing field.

In some aspects, the techniques described herein relate to a method, wherein the trajectory of the contactless card is computed stereoscopically using two distinct optical sensors on the reader device.

In some aspects, the techniques described herein relate to a method, wherein the first position corresponds to the first instance of detection of the rectangular form associated with the contactless card.

In some aspects, the techniques described herein relate to a method, wherein the optimal wireless alignment corresponds to a positioning of the contactless card relative to the reader device for maximizing a possibility of a successful wireless read of the contactless card by the reader device.

In some aspects, the techniques described herein relate to a non-transitory computer-accessible medium including instructions for execution by a computer hardware arrangement, wherein, upon execution of the instructions the computer hardware arrangement performs procedures including: activating one more optical cameras on a reader device upon detecting a contactless card within a near-field communication range of the reader device; identifying the contactless card, by detecting a rectangular form at a first position within a view field of the one or more optical cameras;

determining, based on a light sensor output associated with the reader device, a light intensity value associated with the view field including the contactless card; computing a trajectory of the contactless card, based on one or more transitions in the light intensity value, as the contactless card moves within the view field of the first and the second optical sensors; predicting, upon detecting the light intensity value dropping below an intensity threshold value, a second position of the contactless card based on the trajectory; initiating, upon determining that the second position of the contactless card corresponds to an optimal wireless alignment with the receiving device, a wireless scanning process associated with the device; generating, upon determining that the second position of the contactless card does not corresponds to an optimal wireless alignment, one or more user notifications with respect to the optimal wireless alignment.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Computer readable program instructions described herein can be downloaded to respective computing and/or processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing and/or processing device receives computer readable program instructions from the network and forwards the computer readable program instructions for storage in a computer readable storage medium within the respective computing and/or processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified herein. These computer-readable program instructions may also be stored in a computer-readable storage medium that can direct a computer, a programmable data processing apparatus, and/or other devices to function in a manner, such that the computer readable storage medium having instructions stored therein comprises an article of manufacture including instructions which implement aspects of the functions specified herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions specified herein.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A device for optimizing near-field communication with a contactless card, the device comprising:
   a processor;
   a memory storing one or more applications, the one or more applications comprising a wireless intermediary application;
   a plurality of sensors comprising one or more optical cameras; and
   a communication interface configured to create a communication field;
   wherein, upon entry of a contactless card within the communication field, the intermediary wireless application is configured to:
   activate the one or more optical cameras;
   process, a video signal from the one or more optical cameras to:
      identify the contactless card based on detection of a rectangular form, at a first position, within a view field of the one or more optical cameras;
      determine, based on a light sensor output associated with the device, a light intensity value associated with the view field comprising the contactless card;
      compute a trajectory of the contactless card, based on one or more transitions in the light intensity value, as the contactless card moves within the view field of the one or more optical cameras; and
      predict, upon detecting the light intensity value dropping below an intensity threshold, a second position of the contactless card based on the trajectory;
   initiate, upon determining that the second position of the contactless card corresponds to an optimal wireless alignment with the device, a wireless scanning process; and
   generate, upon determining that the second position of the contactless card does not correspond to an optimal wireless alignment, one or more user notifications with respect to the optimal wireless alignment.

2. The device of claim 1, wherein the trajectory of the contactless card is computed using a relative size of the rectangular form within a viewing frame associated with the viewing field.

3. The device of claim 1, wherein the trajectory of the contactless card is computed stereoscopically using at least two distinct optical sensors on the device.

4. The device of claim 1, wherein the plurality of sensors comprise one or more infrared cameras, and wherein the trajectory of the contactless card is computed using the one or more infrared cameras.

5. The device of claim 1, wherein the first position corresponds to a first instance of the detection of the rectangular form associated with the contactless card, in the view field of the one or more optical cameras.

6. The device of claim 1, wherein the optimal wireless alignment corresponds to a positioning of the contactless card relative to the device for maximizing a possibility of a successful wireless read of the contactless card by the device.

7. The device of claim 1, wherein the intensity threshold corresponds to a predetermined number for an average pixel value associated with the view field of the one or more optical cameras.

8. The device of claim 1, wherein the one or more transitions in the light intensity values are used to identify an out of focus attribute of an image of the contactless card as an indicator of proximity as the contactless card moves within the view field.

9. The device of claim 8, wherein a prediction of the second position for initiating the wireless scanning process, is initiated by a sequence corresponding to a detection of the rectangular form, followed by an identification of the out of focus attribute, followed by the light sensor output value dropping below the intensity threshold.

10. The device of claim 1, wherein the one or more user notifications corresponds to one or more auditory signals for providing alignment instructions.

11. The device of claim 1, wherein a machine learning model is used to identify incorrect placement of the contactless card relative to the device, based on a predicted pattern in a user's card usage behavior.

12. The device of claim 11, wherein the machine learning model is trained using historical training data corresponding to previous sequences of operations associated with previous contactless card transactions.

13. The device of claim 11, wherein the machine learning model is used to determine the incorrect placement of the contactless card relative to the device, in absence of the detection of the contactless card by the one or more optical cameras.

14. The device of claim 1, wherein the device comprises a mobile communication device.

15. A method of optimizing near-field communications with a contactless card, the method comprising:
   activating one more optical cameras on a reader device upon detecting a contactless card within a near-field communication range of the reader device;
   identifying the contactless card, by detecting a rectangular form, at a first position within a view field of the one or more optical cameras;
   determining, based on a light sensor output associated with the reader device, a light intensity value associated with the view field comprising the contactless card;
   computing a trajectory of the contactless card, based on one or more transitions in the light intensity value, as the contactless card moves within the view field of the one or more optical cameras;
   predicting, upon detecting the light intensity value dropping below an intensity threshold value, a second position of the contactless card based on the trajectory;
   initiating, upon determining that the second position of the contactless card corresponds to an optimal wireless alignment with the reader device, a wireless scanning process associated with the reader device; and
   generating, upon determining that the second position of the contactless card does not correspond to an optimal wireless alignment, one or more user notifications with respect to the optimal wireless alignment.

16. The method of claim 15, wherein the trajectory of the contactless card is computed using a relative size of the rectangular form within a viewing frame associated with the viewing field.

17

17. The method of claim 15, wherein the trajectory of the contactless card is computed stereoscopically using two distinct optical sensors on the reader device.

18. The method of claim 15, wherein the first position corresponds to a first instance of detection of the rectangular form associated with the contactless card.

19. The method of claim 15, wherein the optimal wireless alignment corresponds to a positioning of the contactless card relative to the reader device for maximizing a possibility of a successful wireless read of the contactless card by the reader device.

20. A non-transitory computer-accessible medium comprising instructions for execution by a computer hardware arrangement, wherein, upon execution of the instructions the computer hardware arrangement performs procedures comprising:

activating one more optical cameras on a reader device upon detecting a contactless card within a near-field communication range of the reader device;

identifying the contactless card, by detecting a rectangular form, at a first position within a view field of the one or more optical cameras;

18 determining, based on a light sensor output associated with the reader device, a light intensity value associated with the view field comprising the contactless card;

computing a trajectory of the contactless card, based on one or more transitions in the light intensity value, as the contactless card moves within the view field of the one or more optical cameras;

predicting, upon detecting the light intensity value dropping below an intensity threshold value, a second position of the contactless card based on the trajectory;

initiating, upon determining that the second position of the contactless card corresponds to an optimal wireless alignment with the reader device, a wireless scanning process associated with the reader device; and generating, upon determining that the second position of the contactless card does not correspond to an optimal wireless alignment, one or more user notifications with respect to the optimal wireless alignment.

\* \* \* \* \*